United States Patent [19]
Heimberger et al.

[11] 3,867,422
[45] Feb. 18, 1975

[54] PROCESS FOR THE PURIFICATION AND STABILIZATION OF MALONODINITRILE

[75] Inventors: Werner Heimberger, Hanau; Hermann Schmitt, Rodenbach; Gerd Schreyer; Ferdinand Theissen, both of Grossauheim; Wolfgang Weigert, Offenbach, all of Germany

[73] Assignee: Deutsche Gold-und Silber-Scheideanstalt vormals Roessler, Frankfurt (Main), Germany

[22] Filed: Dec. 7, 1973

[21] Appl. No.: 422,738

[30] Foreign Application Priority Data
Dec. 8, 1972 Germany.................. 2260126

[52] U.S. Cl..................... 260/465.8 R, 260/465.3
[51] Int. Cl................... C07c 121/20, C07c 121/22
[58] Field of Search.............. 260/465.8 R, 465.3

[56] References Cited
UNITED STATES PATENTS

| | | | |
|---|---|---|---|
| 2,553,406 | 5/1951 | Dixon | 260/465.8 R |
| 2,606,917 | 8/1952 | Dixon | 260/465.8 R |
| 3,417,126 | 12/1968 | Taguchi et al. | 260/465.8 R |
| 3,541,133 | 11/1970 | Johnson et al. | 260/465.8 R |
| 3,549,684 | 12/1970 | Rosin | 260/465.8 R |
| 3,607,136 | 9/1971 | Smiley et al. | 23/299 |
| 3,616,269 | 10/1971 | Aelony et al. | 260/465.8 R |
| 3,655,721 | 4/1972 | Arni et al. | 260/465.8 R |
| 3,683,003 | 8/1972 | Aufdereggen et al. | 260/465.8 R |
| 3,729,499 | 4/1973 | Lussling et al. | 260/465.8 R |

FOREIGN PATENTS OR APPLICATIONS
46-9685  11/1971  Japan................ 260/465.8 R

*Primary Examiner*—Joseph P. Brust
*Attorney, Agent, or Firm*—Cushman, Darby & Cushman

[57] ABSTRACT

Malonodinitrile produced from cyanogen halide and acetonitrile and containing fumarodinitrile as an impurity is purified and stabilized by recrystallizing from an aliphatic alcohol or dialkyl ether in the presence of benzonitrile.

12 Claims, 1 Drawing Figure

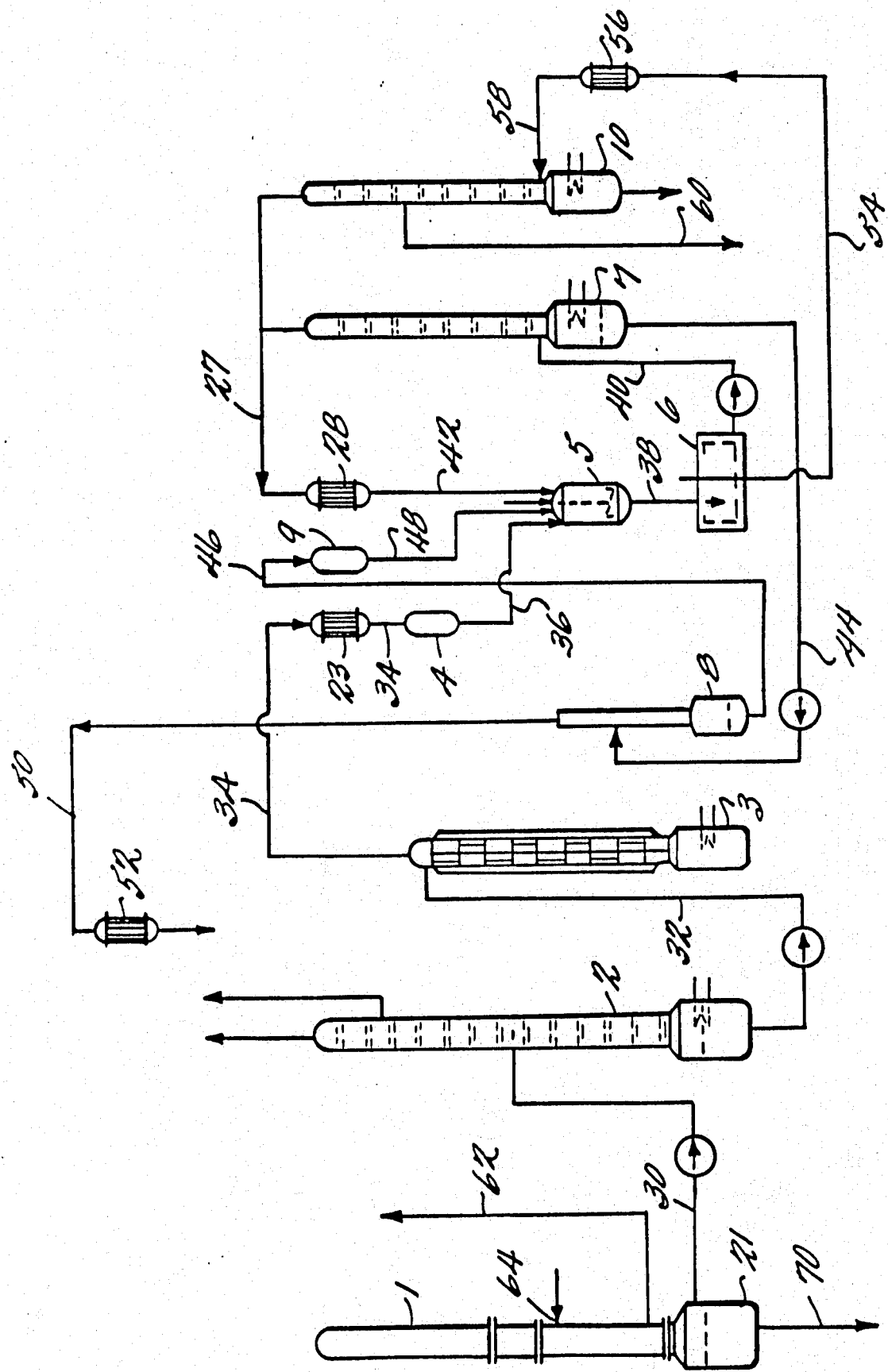

PROCESS FOR THE PURIFICATION AND STABILIZATION OF MALONODINITRILE

One of the industrially interesting processes for the production of malonodinitrile consists of reacting a cyanogen halide, e.g., cyanogen chloride or cyanogen bromide, with acetonitrile. The malonodinitrile formed thereby is first liquid and water clear but it changes its color after a short time of standing, i.e., several days, and gradually darkens.

It has been proven that the product cannot be purified by distillation from the small parts of byproducts which cause these properties. Even using pure acetonitrile, there is not obtained pure malonodinitrile according to known processes and the impurities consisting of unsaturated nitriles, as for example, maleic acid dinitrile and fumarodinitrile and succinodinitrile, cannot be separated by distillation.

Also, the purification of malonodinitrile by crystallization from organic solvents, such as alcohols, for example, was unsatisfactory. Thereby after a short period of time there is obtained liquid and colored malonodinitrile which still contains fumarodinitrile.

Therefore, according to German Offenlegungsschrift 1921662 the malonodinitrile containing reaction mixture was worked up, specifically either by further treatment according to the Diels-Alder method or by hydrogenation. The yield by hydrogenation was poorer but the degree of purity of the malonodinitrile recovered higher than by carrying out the Diels-Alder reaction. In both cases, however, no melting point was given for the malonodinitrile so that apparently it was treated as a liquid product. Besides, no observations were described in regard to the gradual darkening of the product upon long storage.

Entirely apart from the missing data, however, a purification operation by additionally carrying out a hydrogenation with specific catalysts and above all a purification by the Diels-Alder reaction in which additional foreign materials must be introduced which are not present in the production reaction is tied to specific industrial expenses and can also lead to side reactions.

The noble metal catalysts added in the hydrogenation are quickly poisoned and generally are only regenerated with great difficulty. In the Diels-Alder process byproducts are formed by cracking as a result of which the yields are partially strongly reduced. Since dark coloration also occurs in the presence of crystalline products such as result after cooling of the product distillate in the reaction of cyanogen chloride and acetonitrile and therewith also the malonodinitrile so produced cannot be stored unchanged over long periods of time in any form, the finding of a process for purification and stabilization of malonodinitrile is of substantial significance.

It has now been found that malonodinitrile can be recovered in crystalline, colorless and unlimitedly stabile form if the malonodinitrile produced from cyanogen halide, e.g., cyanogen chloride or cyanogen bromide and acetonitrile, is recrystallized from aliphatic, branched or straight chain alcohols or dialkyl ethers in presence of benzonitrile.

As aliphatic alcohols, e.g., alkanols with branched or straight carbon chains there can be used alcohols which are liquid to as low as 0°C, and can be separated by distillation from malonodinitrile (boiling point of the crude malonodinitrile about 190°C). Such alcohols include alkanols such as methyl alcohol, ethyl alcohol, n-propyl alcohol, isopropyl alcohol, n-butyl alcohol, sec. butyl alcohol, t-amyl alcohol, n-hexyl alcohol, n-heptyl alcohol, n-octyl alcohol, isooctyl alcohol and 2-octanol. The preferred alcohol is isopropyl alcohol.

The same freezing and boiling point requirements are also set for dialkyl ethers which likewise can have straight or branched carbon chains, suitable ethers include diethyl ether, di n-propyl ether, diisopropyl ether, di n-butyl ether, sec. butyl ethyl ether, t-butyl ethyl ether, t-butyl methyl ether, sec. butyl methyl ether, n-butyl ethyl ether, n-butyl methyl ether, isoamyl methyl ether, butyl propyl ether, di sec. butyl ether and diisoamyl ether. Especially preferred is diisopropyl ether.

Benzonitrile is usually added in an amount of 0.01 to 5 parts by weight to 1 part by weight of fumarodinitrile in the product to be purified, preferably the benzonitrile is used in an amount of 0.1 to 1.3 parts by weight of the fumarodinitrile. The amount of fumarodinitrile contained in the crude malonodinitrile is determined in a preliminary test.

If the benzonitrile from the outset is present in the crude malonodinitrile in the amounts set forth, there is saved a special addition. For example, this is the case if there is employed as the starting material in the production of malonodinitrile crude acetonitrile obtained from the production of acrylonitrile from propene, ammonia and oxygen, that generally contains 0.5 to 1.5 weight percent of benzonitrile. Along with this, the process also furnishes a possibility that the acetonitrile accumulating in the named acrylonitrile synthesis can be profitably employed beyond the demands therefor.

In the recrystallization from alcohol (or ether) there are added such amounts of this kind of alcohol which are customary in the recrystallization. Especially favorable are 1 to 2 parts of alcohol for each part of crude malonodinitrile by weight. As recrystallization temperatures there are used 0–10°C., preferred 0° to 5°C.

Especially long storage stability is shown by malonodinitrile which has been purified by the process of the invention, if the malonodinitrile is filtered off after recrystallization and the malonodinitrile which is still wet with alcohol is again melted and is distilled in the presence of an inorganic or organic acid such as phosphoric acid, tartaric acid, malonic acid, citric acid and especially oxalic acid. The acid is usually added in an amount of 1 part by weight of acid to 99 parts weight of malonodinitrile. However, there can be used 0.5 to 5 parts of acid based on the total of acid and malonodinitrile. The acid usually is less volatile than malonodinitrile.

The process can be carried out either continuously or discontinuously. It is explained below in connection with a continuous process.

The single FIGURE of drawings is a schematic diagram illustrating the process.

Referring more specifically to the drawings, the crude acetonitrile containing product coming from the quench zone 21 goes via line 30 to column 2 where it is freed from acetonitrile (B.P.$_{760}$ 81.6°C), for example at normal pressure and 81.6°C. (whereupon the acetonitrile is returned to reactor 1, this return is not shown specially) and is condensed as crude malonodinitrile in container 4 after passing via line 32 to thin film evaporator 3 and then via line 34 to heat exchanger 23. The crude malonodinitrile goes to the container 4 via line 34. The liquid crude product then runs slowly from line 36 with stirring into the alcohol, e.g., isopropyl alcohol, in container 5 where the alcohol is held between 0° and 5°C. with further stirring. The crystallizate goes via line 38 to centrifuge 6 where it is separated from the mother liquor. The alcoholic mother liquor, according to the amount of impurities can be used for two to three further crystallizations before it is converted to regenerated alcohol by distillation in column 7 to which it passes via line 40. The distilled alcohol is withdrawn from the head of column 7 and returns via line 27, condenser 28 and line 42 to container 5. Residual malonodinitrile which goes via line 44 into column 8 and is further worked up. By distillation of the main amount of the collected impurities of fumarodinitrile, maleic acid dinitrile and benzonitrile in column 8, the residual malonodinitrile remaining in the sump of column 8 goes by way of line 46, container 9 and line 48 to container 5 where it undergoes the same purification as already described. The byproducts leave the system via line 50 and condenser 52. The alcohol wet product obtained in centrifuge 6 goes via line 54 to heat exchanger 56 where it is melted. Then it goes via line 58 to column 10 where it is freed from adhering alcohol and the malonodinitrile with addition of 1 weight percent of an acid is distilled over as pure malonodinitrile and is withdrawn via line 60.

The volatile HCl byproduct formed in reactor 1 is withdrawn through line 62. The acetonitrile and cyanogen chloride, quenching aqueous acetonitrile introduced to reactor 1 at 64. Water was withdrawn at 70.

The industrial advantage of the present process is first in the recovery of a crystalline colorless product which is stable for more than one year additionally it permits the process to be carried out industrially in a very simple manner.

Unless otherwise indicated, all parts and percentages are by weight.

EXAMPLE 1 a. Production of crude malonodinitrile.

The experimental apparatus consisted of a 600 mm long quartz tube having a diameter of 50 mmn and a capacity of 710 ml. At the upper entrance of the tube there was located a narrowed construction about 150 mm long which was filled with Raschig rings and served as a mixing interval. At the lower end the tube had a funnel shaped construction as a quenching space.

Per hour there were fed into the reactor over the mixing interval 145 grams of acetonitrile (99.5 percent = 3.52 moles) and 49 grams of cyanogen chloride (100 percent = 0.797 mole), a mole ratio of 4.4:1. The reactants were preheated to 120°C before going into the reactor. The residence time in the reactor was 6.7 seconds and the temperature in the reactor was 790 to 815°C. The gaseous reaction product of crude malonodinitrile and hydrogen chloride which also contained maleic acid dinitrile, fumarodinitrile and succinodinitrile passed at about 100°C. into the quench zone where it was cooled by recirculating aqueous acetonitrile solution (crude product with about 50 percent water) and was neutralized by marble pieces located in the quench space.

After a short recycling time in the quench cycle the quench solution began to separate into two phases, whereby the lighter (organic) phase consisted of acetonitrile and malonodinitrile. The heavy (aqueous) phase contained chiefly calcium chloride besides a little acetonitrile which can be recovered through subsequent purification of the solution continuously expelled into the waste water.

The light phase likewise is continuously drawn off and subjected to a distillation whereby the excess acetonitrile passes over completely at 80° to 82°C. and normal pressure. By subsequent vacuum distillation in a thin film evaporator the malonodinitrile with by-products such as fumarodinitrile and maleic acid dinitrile and benzonitrile at a temperature of 93° to 100°C. at 8 Torr and a sump temperature of 150°C. is separated very completely from the viscous residue which consists of high boiling tarry products and calcium chloride.

b. Purification of the crude malonodinitrile 1,000 grams of liquid crude malonodinitrile (79.7 weight percent) with 20 grams of benzonitrile were added within 30 minutes to 1,500 ml of isopropanol which was held between 0° and 5°C. with strong stirring.

After two hours, further stirring at 0° to 2°C. the malonodinitrile which crystallized out was strongly filtered off with suction and subsequently washed with 500 ml of cold isopropanol. The isopropanol wet product was worked up further together with the malonodinitrile recovered from the mother liquor. First the mother liquor was concentrated and 95 percent of the isopropanol recovered thereby. From the residue a forerun was taken off at 10 Torr up to 80°C. and the residue obtained as a crystalline product from isopropanol in the same manner as described above.

Both crystalline portions were distilled over once more with addition of 4 grams of oxalic acid whereby the adhering isopropanol passed over as a forerun. The entire malonodinitrile passed over at 99° to 100°C. and 10 Torrs. There were obtained 682 grams with a melting point of 31.5°C. The yield accordingly amounted to 85.6 percent of theory. Although there were present in the crude malonodinitrile about 4 weight percent fumarodinitrile, 2 weight percent maleic acid dinitrile, 2 weight percent succinodinitrile and 2 weight percent benzonitrile, the purified product after three years storage showed no discoloration.

EXAMPLE 2 a. Production of crude malonodinitrile.

In the same apparatus as in Example 1 there were fed into the reactor over the mixing interval 288 grams of crude acetonitrile (50.4 percent = 3.52 moles) and 49 grams of cyanogen chloride (100 percent = 0.797 moles), a mole ratio of 4.4:1. The reactants were preheated to 120°C. The residue time in the reactor was 6.7 seconds and the temperature in the reactor was 790° to 815°C. The gaseous reaction product of crude malonodinitrile and hydrogen chloride which also contained maleic acid dinitrile, fumarodinitrile, succinodinitrile and benzonitrile passed at about 100°C. into the quench zone where it was cooled by recirculating aqueous acetonitrile solution and was neutralized by small marble pieces located in the quench space.

The further working up was as in Example 1.

b. Purification of crude malonodinitrile.

100 grams of liquid crude malonodinitrile (83 weight percent) was added within 30 minutes to 150 ml of diisopropyl ether which was held between 0° to 5°C. with strong stirring.

After 2 hours further stirring at 0° to 2°C. the malonodinitrile which crystallized out was strongly filtered off with suction and subsequently washed with 50 ml of cold diisopropyl ether. The filtered off product was further worked up as in Example 1. The mother liquor was also concentrated and thereby 97 percent of the diisopropyl ether was again recovered, wherefrom there was also obtained a crystalline product.

The distillation was carried out in Example 1 and gave 72 grams of pure malonodinitrile with a melting point of 31.5°C. This was 86.8 percent of theory.

EXAMPLE 3

The production of the malonodinitrile was as in Example 2(a)ratios and the purification was as in Example 2(b).

For purification there were used the following solvents in about the same rations of amounts as were used in Example 1(b) and the yields of pure malonodinitrile obtained were as follows:

1. Amyl alcohol 70 percent of theory;
2. n-butyl alcohol 75.5 percent of theory;
3. Isobutanol 78.2 percent of theory.

These samples according to Examples 2 and 3 remained unchanged after three years storage in the same manner as in Example 1.

What is claimed is:

1. A process for the purification and stabilization of impure malonodinitrile prepared from a cyanogen halide selected from the group consisting of cyanogen chloride and cyanogen bromide and acetonitrile and which contains fumarodinitrile comprising providing benzonitrile in an amount sufficient to prevent the discolorizing effects of fumarodinitrile, said amount being 0.01 to 5 parts of benzonitrile per part of fumarodinitrile in the impure malonodinitrile and crystallizing said impure malonodinitrile from a solvent which is an alkanol or dialkyl ether which is liquid at a temperature of 0°C. and boils at a temperature below the boiling point of malonodinitrile.

2. A process according to claim 1 wherein the cyanogen halide is cyanogen chloride.

3. A process according to claim 1 wherein there is added benzonitrile in addition to any present in the impure malonodinitrile.

4. A process according to claim 1 wherein the crystallization is carried out at 0° to 10°C.

5. A process according to claim 1 wherein the solvent is an alkanol.

6. A process according to claim 5 wherein the alkanol is isopropanol.

7. A process according to claim 1 wherein the solvent is a dialkyl ether.

8. A process according to claim 7 wherein the ether is diisopropyl ether.

9. A process according to claim 1 wherein the amount of benzonitrile is 0.1 to 1.3 parts per part of fumaronitrile.

10. A process according to claim 1 wherein at least a part of the benzonitrile is introduced into the process with the acetonitrile, the acetonitrile having been obtained as a byproduct in the production of acrylonitrile from propylene, ammonia and oxygen.

11. A process according to claim 1 including the further step of melting the crystallized malonodinitrile, adding a small amount of an acid and distilling the malonodinitrile to further purify it.

12. A process according to claim 11 wherein the acid is oxalic acid.

* * * * *